(12) United States Patent
Liu

(10) Patent No.: US 10,401,685 B2
(45) Date of Patent: Sep. 3, 2019

(54) ARRAY SUBSTRATE, MANUFACTURING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Xiaona Liu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/541,739

(22) PCT Filed: Sep. 13, 2016

(86) PCT No.: PCT/CN2016/098882
§ 371 (c)(1),
(2) Date: Jul. 6, 2017

(87) PCT Pub. No.: WO2017/181581
PCT Pub. Date: Oct. 26, 2017

(65) Prior Publication Data
US 2018/0210292 A1 Jul. 26, 2018

(30) Foreign Application Priority Data
Apr. 21, 2016 (CN) .......................... 2016 1 0258014

(51) Int. Cl.
G02F 1/1337 (2006.01)
G02F 1/1343 (2006.01)
G02F 1/1362 (2006.01)

(52) U.S. Cl.
CPC .... G02F 1/133707 (2013.01); G02F 1/13439 (2013.01); G02F 1/134309 (2013.01);
(Continued)

(58) Field of Classification Search
CPC ......... G02F 1/133707; G02F 1/134309; G02F 1/13439; G02F 2001/134372
See application file for complete search history.

(56) References Cited

U.S. PATENT DOCUMENTS

2007/0024789 A1* 2/2007 Itou ................... G02F 1/134363
349/139
2007/0279567 A1* 12/2007 Matsushima ..... G02F 1/134363
349/143
(Continued)

FOREIGN PATENT DOCUMENTS

| CN | 103488002 A | 1/2014 |
|---|---|---|
| CN | 203480175 A | 3/2014 |

(Continued)

OTHER PUBLICATIONS

International Search Report and Written Opinion dated Jan. 23, 2017; PCT/CN2016/098882.

*Primary Examiner* — Jia X Pan
(74) *Attorney, Agent, or Firm* — Ladas & Parry LLP

(57) ABSTRACT

An array substrate, a manufacturing method thereof and a display device are provided. The array substrate including a slit electrode, wherein the slit electrode includes a plurality of slits; and one end of each of the slits is opened. Problem of overlarge area of dark region at edges of a subpixel is solved, thereby improving the transmittance and the light efficiency of liquid crystals.

17 Claims, 6 Drawing Sheets

(52) U.S. Cl.
CPC .. *G02F 1/134363* (2013.01); *G02F 1/136286* (2013.01); *G02F 2001/134372* (2013.01); *G02F 2201/123* (2013.01)

(56) References Cited

U.S. PATENT DOCUMENTS

| | | | | |
|---|---|---|---|---|
| 2009/0015774 A1* | 1/2009 | Asakura | ............ | G02F 1/134363 349/141 |
| 2009/0059139 A1 | 3/2009 | Kurasawa | | |
| 2009/0128727 A1* | 5/2009 | Yata | ................. | G02F 1/134363 349/46 |
| 2012/0044446 A1* | 2/2012 | Hara | ................. | G02F 1/134309 349/139 |
| 2013/0114024 A1* | 5/2013 | Kurasawa | ........... | G02F 1/13363 349/96 |
| 2014/0063429 A1* | 3/2014 | Huh | ................. | G02F 1/133707 349/139 |
| 2014/0092353 A1* | 4/2014 | Matsushima | ..... | G02F 1/133512 349/110 |
| 2014/0118639 A1* | 5/2014 | Matsushima | ....... | G02F 1/13338 349/12 |
| 2014/0293176 A1* | 10/2014 | Tamaki | ............. | G02F 1/134363 349/33 |
| 2014/0293177 A1* | 10/2014 | Matsushima | ..... | G02F 1/134363 349/33 |
| 2014/0354931 A1* | 12/2014 | Kurasawa | ......... | G02F 1/134336 349/124 |
| 2015/0062496 A1* | 3/2015 | Kang | ................. | G02F 1/133528 349/96 |
| 2015/0108486 A1 | 4/2015 | Um et al. | | |
| 2015/0116644 A1* | 4/2015 | Morishita | ......... | G02F 1/134363 349/138 |
| 2016/0062158 A1* | 3/2016 | Matsushima | ..... | G02F 1/134363 349/123 |
| 2016/0370661 A1* | 12/2016 | Ono | ................. | G02F 1/134309 |
| 2017/0038613 A1 | 2/2017 | Han et al. | | |

FOREIGN PATENT DOCUMENTS

| | | |
|---|---|---|
| CN | 203773203 A | 8/2014 |
| CN | 104698696 A | 6/2015 |
| CN | 105676550 A | 6/2016 |

\* cited by examiner

US 10,401,685 B2

ARRAY SUBSTRATE, MANUFACTURING METHOD THEREOF AND DISPLAY DEVICE

TECHNICAL FIELD

Embodiments of the present disclosure relate to an array substrate, a manufacturing method thereof and a display device.

BACKGROUND

In general, the display modes of liquid crystal displays (LCDs) mainly include fringe field switching (FFS) technology, high aperture ratio advanced super dimensional switching (HADS) technology, in-plane switching (IPS) technology, vertical alignment (VA) technology, etc. The defect of the LCD with FFS mode is that: as a pixel electrode adopts the slit electrode 10 as illustrated in FIG. 1, a dark region as illustrated in FIG. 2 will be produced at edges of the subpixel, so that the transmittance of the subpixel can be affected. In the LCD with HADS mode, a common electrode adopts a slit electrode, and turnings of the slit electrode are adjusted from long-sides of the subpixel to short-sides of the subpixel. The light leakage simulation diagram is as illustrated in FIG. 3, from which it can be seen that the problem of the dark region has been improved but the improved effect is limited.

SUMMARY

Embodiments of the present disclosure provide an array substrate, a manufacturing method thereof and a display device, which can solve the problem of overlarge area of a dark region at edges of a subpixel, thereby improving the transmittance and the light efficiency of liquid crystals.

Embodiments of the disclosure provide an array substrate, including a slit electrode, wherein the slit electrode includes a plurality of slits; and one end of each of the slits is opened.

Embodiments of the disclosure further provide a display device, including the array substrate provided by at least one embodiments of the disclosure.

Embodiments of the disclosure further provide a manufacturing method of an array substrate, including forming a slit electrode, wherein forming the slit electrode includes: depositing an electrode material layer; and forming a slit electrode by a masking process with a mask, a portion of the mask applied in the masking process, where corresponding to slits of the slit electrode, being extended to edges of a subpixel, so that one end of each of the slits of the slit electrode is opened.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

10—slit electrode, 111—slit, 11—data line, 12—gate line, 20—array substrate, 30—color filter (CF) substrate, 40—liquid crystal, 31—base substrate, 32—CF layer, 21—base substrate, 22—common electrode, 23—gate insulating layer, 24—source/drain metal layer, 25—insulating layer, 26—pixel electrode; 101—electrode strip; 1010—electrode strip; 1111, 1112—slit; 01—subpixel.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the invention. Based on the described embodiments herein, those skilled in the art can obtain other embodiment(s), without any inventive work, which should be within the scope of the invention.

Figure 4:
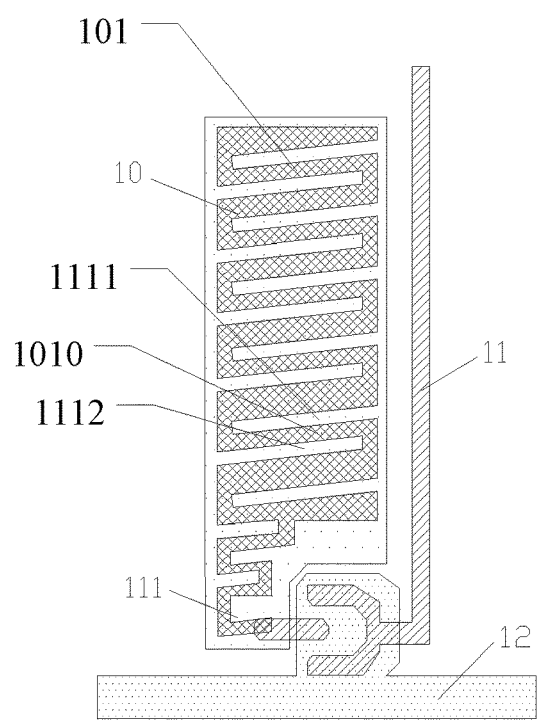
FIG. 4 is a schematic structural view of an array substrate with FFS mode provided by the embodiment of the present disclosure.

At least one embodiment of the present disclosure provides an array substrate. As illustrated in FIG. 4, the array substrate includes a slit electrode 10, and one end of a slit 111 of the slit electrode 10 is opened. In FIG. 4, reference numeral 11 denotes a data line and reference numeral 12 denotes a gate line. FIG. 4 illustrates one subpixel 01. For instance, subpixels 01 can be defined by a plurality of gate lines 12 and a plurality of data lines 11, but not limited thereto. One subpixel 01, for instance, includes one gate line, one data line, one pixel electrode and one switching element. The switching element, for instance, is a thin-film transistor (TFT). The subpixel 01 is the minimum display unit in the array substrate.

As illustrated in FIG. 4, the slit electrode 10 includes a plurality of electrode strips 101. The plurality of electrode strips 101 are connected electrically. For instance, in the same domain, two adjacent electrode strips 101 are parallel with each other. A slit 111 is formed between two adjacent electrode strips 101, in which openings of slits 111 between one electrode strip 101 and two electrode strips 101 adjacent to this electrode strip are disposed on different sides of the slit electrode 10, for instance, disposed on opposite sides of the slit electrode 10. The opposite sides, for instance, include a left side and a right side, or an upper side and a lower side. As illustrated in FIG. 4, slits 111 between an electrode strip 1010 and two electrode strips adjacent to the electrode strip 1010 are respectively a slit 1111 and a slit 1112; an opening of the slit 1111 and an opening of the slit 1112 are disposed on different sides of the slit electrode 10; and the opening of the slit 1111 and the opening of the slit 1112 are respectively disposed on the right side and the left side of the subpixel 01.

As illustrated in FIG. 4, in the subpixel 01, the slit electrode includes an electrode wiring provided with a plurality of bending structures. The slit electrode 10 as illustrated in FIG. 4 is an electrode wiring on the whole, and the electrode wiring includes a plurality of bending structures. For instance, when the subpixel includes a plurality of domains, in the subpixel 01, the slit electrode can also include a plurality of electrode wirings provided with a plurality of bending structures. The slit electrode in FIG. 8 includes two electrode wirings provided with a plurality of bending structures.

Figure 1:
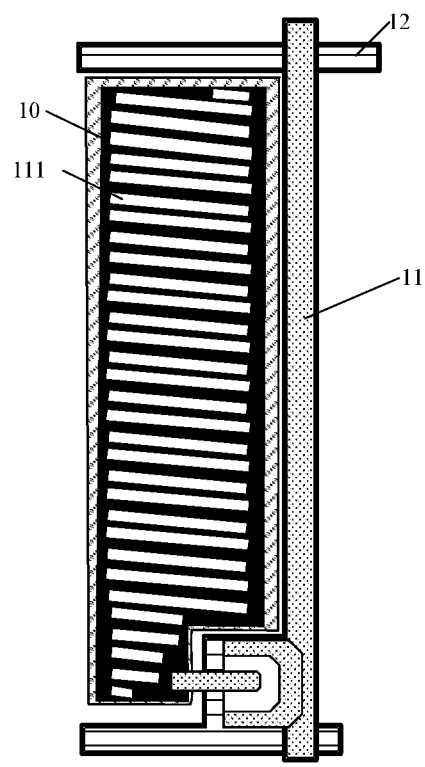
FIG. 1 is a schematic structural view of an array substrate with FFS mode.
Figure 2:
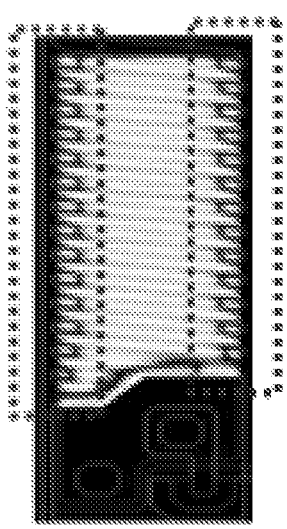
FIG. 2 is a light leakage simulation diagram of a liquid crystal display with FFS mode.
Figure 3:
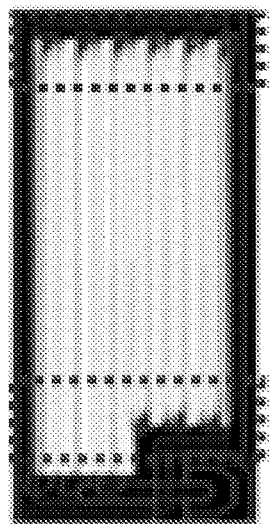
FIG. 3 is a light leakage simulation diagram of a liquid crystal display with HADS mode.
Figure 9:
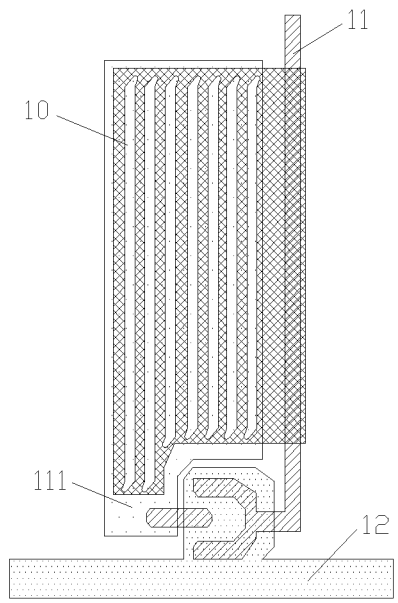
FIG. 9 is a schematic diagram of a slit electrode with a turning design of an array substrate with HADS mode provided by an embodiment of the present disclosure.

A conventional slit electrode is as illustrated in FIG. 1, and both ends of the slit 111 are closed structures. In order to improve the display quality of products and avoid the problem of tracing mura in the case of finger press, the design of closed positions of the slits 111 disposed at edges of the subpixel is improved to have specific turning structures, as illustrated in FIG. 9. An inventor has found that a dark region will be produced at the edges of a subpixel, as illustrated in FIGS. 2 and 3. In one embodiment of the present disclosure, one end of the slit 111 in the slit electrode 10 is opened, namely adopting an open structure; the edge of the subpixel can adopt the means of opening along the slit trend, or maintaining the original design that the edge of the subpixel has a turning shape and an opening along the turning trend at the tail end of the slit; and the other end maintains the closed structure, and the closed structure still adopts the design that there is a turning shape at the edge of the subpixel, so that parts of the slit electrode 10 can be still electrically connected, and meanwhile, the problem of tracing mura in the case of finger press can be avoided.

Figure 10:
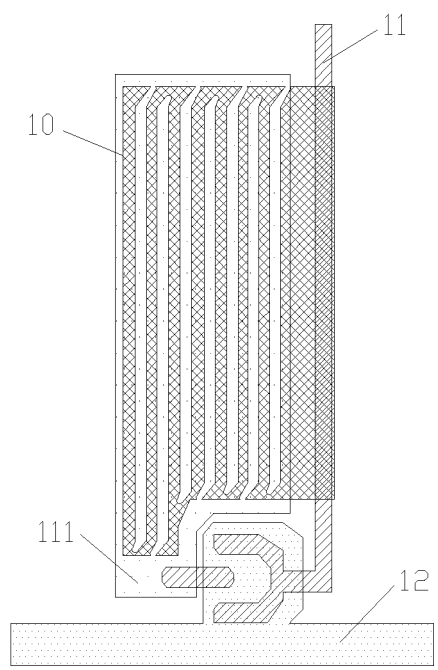
FIG. 10 is a schematic diagram of a slit electrode with a turning design of an array substrate with HADS mode provided by an embodiment of the present disclosure.

It should be understood that the slit electrode 10 includes a plurality of slits 111. No limitation is given in the embodiment to which end portions of which slits adopt open structures, as long as it can be ensured that the parts of the slit electrode 10 can be electrically connected with each other. The slit electrode 10 can also include closed slits. No limitation will be given here in the embodiment. For instance, a structure of one kind of slit electrode 10 is a zigzag wiring in a subpixel region, and turnings of the zigzag wiring can be, as illustrated in FIG. 4, respectively disposed on edges of two long-sides of the subpixel, and can also be, as illustrated in FIG. 10, respectively disposed on edges of two short-sides of the subpixel.

The zigzag wiring in the subpixel region can be that: initial ends of odd rows of slits 111 are closed and tail ends of that are opened, and initial ends of even rows of slits 111 are opened and tail ends of that are closed. Of course, the case can also be that: the initial ends of the odd rows of slits 111 are opened and the tail ends of that are closed, and the initial ends of the even rows of slits 111 are closed and the tail ends of that are opened.

The array substrate provided by the embodiment of the present disclosure improves the slit electrode, allows one end of the slit to be opened, so as to reduce the shielding of the edge of the subpixel, solves the problem of overlarge area of a dark region produced at the edges of the subpixel, and hence improves the transmittance and the light efficiency of liquid crystals.

For better understanding of the technical proposals of the embodiments of the present disclosure, detailed description will be given below to the structure of the array substrate with reference to the preferred embodiments.

Figure 5:
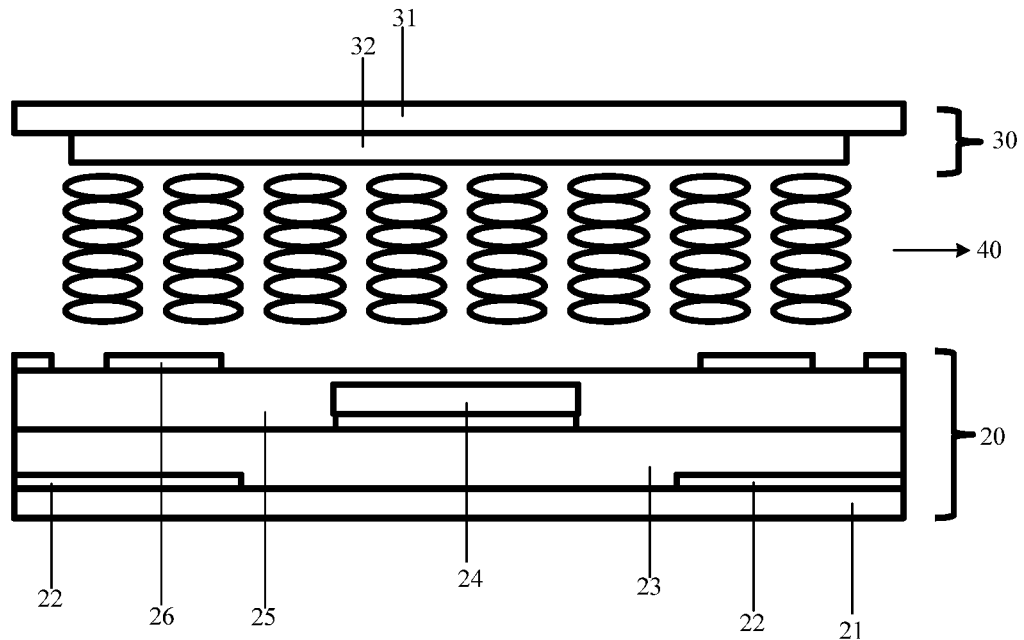
FIG. 5 is a schematic structural sectional view of a display device with FFS mode provided by an embodiment of the present disclosure.

In one embodiment of the present disclosure, as illustrated in FIGS. 4 and 5, a display device with FFS mode includes an array substrate 20, a CF substrate 30 and liquid crystals 40. The CF substrate 30 includes a base substrate 31 and a CF layer 32 disposed on the base substrate 31. The array substrate 20 with FFS mode includes a base substrate 21 and a common electrode 22, a gate insulating layer 23, a source/drain metal layer 24 (corresponding to data lines 11, for instance, a source electrode, a drain electrode and a data line are formed in the same layer), an insulating layer 25 and a pixel electrode 26 which are disposed on the base substrate 21. The pixel electrode 26 is a slit electrode, and initial ends or tail ends of slits 111 of the slit electrode are opened. Compared with FIG. 2, in the light leakage simulation diagram of the display device with FFS mode, the area of a dark region on the left and right sides of the subpixel is greatly reduced, so the transmittance can be improved.

Figure 6:
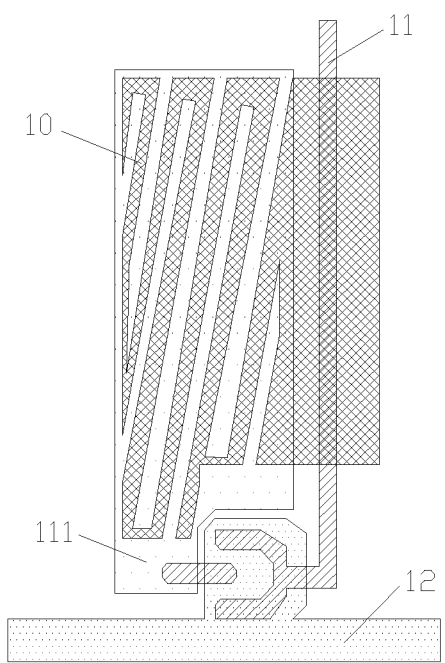
FIG. 6 is a schematic structural view of an array substrate with HADS mode provided by an embodiment of the present disclosure.
Figure 7:
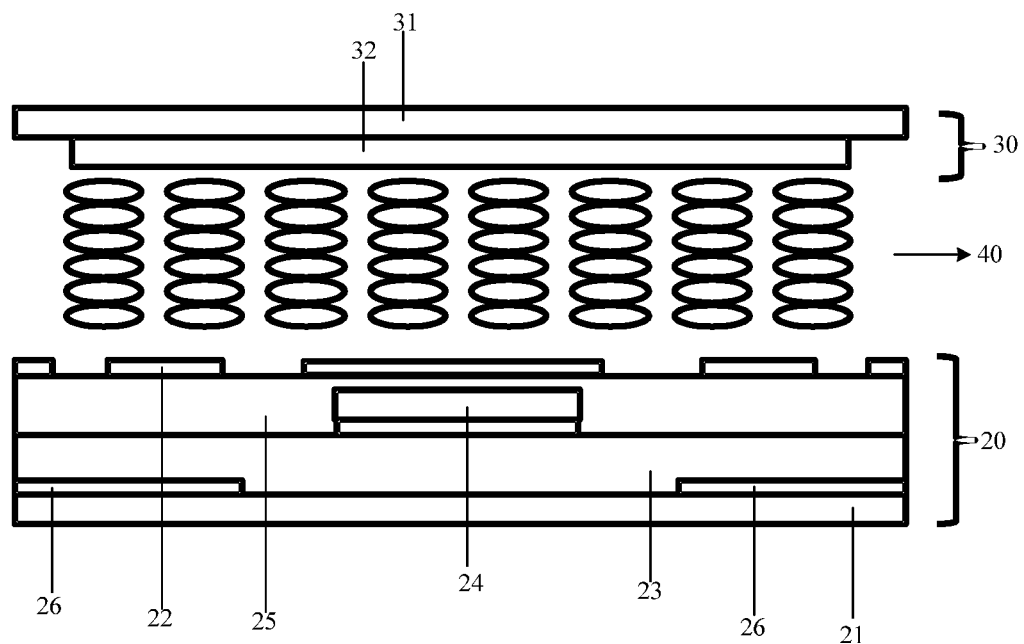
FIG. 7 is a schematic structural sectional view of a display device with HADS mode provided by an embodiment of the present disclosure.

In another embodiment of the present disclosure, as illustrated in FIGS. 6 and 7, a display device with HADS mode includes an array substrate 20, a CF substrate 30 and liquid crystals 40. The CF substrate 30 includes a base substrate 31 and a CF layer 32 disposed on the base substrate 31. The array substrate 20 with HADS mode includes a base substrate 21, and a common electrode 22, a gate insulating layer 23, a source/drain metal layer 24 (corresponding to data line 11, for instance, a source electrode, a drain electrode and a data line are formed in the same layer), an insulating layer 25 and a pixel electrode 26 which are disposed on the base substrate 21. The common electrode 22 is a slit electrode, and initial ends or tail ends of the slits 1 on the common electrodes are opened. Compared with FIG. 3, in the light leakage simulation diagram of the display device with HADS mode, the area of a dark region on the upper and lower sides of the subpixel is also reduced, so the transmittance can be improved.

Figure 8:
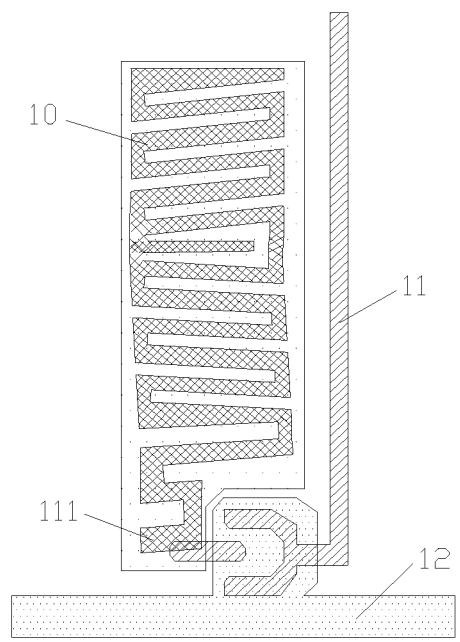
FIG. 8 is a schematic diagram of a double-domain subpixel of an array substrate with FFS mode provided by an embodiment of the present disclosure.

The proposal of the embodiment can be also applied to a double-domain and multi-domain subpixel. Taking a double-domain subpixel as an example, as illustrated in FIG. 8 which illustrates a double-domain subpixel of an array substrate with FFS mode, in a first region of the subpixel, slits 111 of a slit electrode 10 are extended along a first direction; and in a second region of the subpixel, slits 111 of the slit electrode 10 are extended along a second direction, and the first direction is not parallel with the second direction. As the slits 111 of the slit electrode 10 have different extending directions, after being applied by an electrical field and driven, the alignment of liquid crystals in the first and second regions of the subpixel is inconsistent, so double domains can be formed. The double-domain and multi-domain subpixels can improve the problem of too narrow viewing angle.

Figure 11:
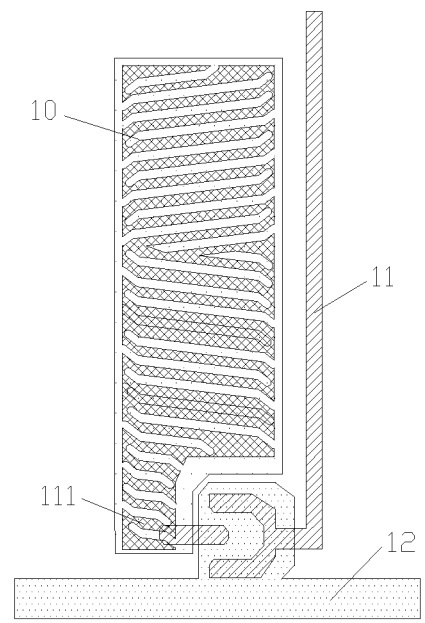
FIG. 11 is a schematic diagram of a double-domain subpixel of an array substrate with FFS mode provided by an embodiment of the present disclosure.

In addition, in specific implementation, the slits 111 of the slit electrode 10 can be in different shapes, namely the shape of the slits 111 of the slit electrode 10 can vary. For instance, in order to overcome problem of tracing mura, both ends of the slits 111 in the slit electrode can also include turnings, as illustrated in FIG. 9 which is a schematic diagram of a slit electrode of an array substrate with HADS mode. When the proposal of the embodiment is applied, one end of the slit 111 adopts an open structure, as long as the slit is continuously extended along the turning trend of the slit at a tail end of the slit (one end provided with the open structure, e.g., the upper end in the figure), until the closed structure is opened; and one end which is not opened maintains the original turning structure, specifically as illustrated in FIG. 10. Moreover, for instance, as illustrated in FIG. 11 which is a schematic diagram of a double-domain subpixel of an array substrate with FFS mode in the embodiment of the present disclosure, one end of a slit 111 is opened along the turning direction.

The array substrate provided by the embodiment of the present disclosure allows one end of the slit to be opened, so as to reduce the shielding of the edge of the subpixel, solves the problem of overlarge area of a dark region at the edges of the subpixel, and hence improves the transmittance.

The embodiment of the present disclosure further provides a display device, which includes any foregoing array substrate. The display device has the advantages of small area of the dark region at the edges of the subpixel, high transmittance and energy saving. The display device can be: any product or component with display function such as an LCD panel, e-paper, a mobile phone, a watch, a tablet PC, a TV, a display, a notebook computer, a digital picture frame and a navigating device.

The embodiment of the present disclosure further provides a method for manufacturing an array substrate, which includes forming a slit electrode. Forming the slit electrode includes: S1: depositing an electrode material layer; and S2: forming a slit electrode by a masking process with a mask, a portion of the mask applied in the masking process, where corresponding to slits of the slit electrode, being extended to edges of a subpixel, so that one end of each of the slits of the slit electrode can be opened.

In the manufacturing method of the array substrate, provided by the embodiments of the present disclosure, the process of forming the slit electrode is improved; the mask for forming a pattern of the slit electrode is improved; and a portion of the mask applied in the masking process, where corresponding to slits of the slit electrode, is extended to edges of a subpixel, so that one end of each of the slits can be opened. The remaining is almost similar to the conventional method, so no limitation will be given here in the embodiment of the present disclosure. The manufacturing method of the array substrate, provided by the embodiments, allows one end of the slit of the slit electrode to be opened, so as to reduce the shielding of the edge of the subpixel, solves the problem of overlarge area of the dark region produced at the edges of the subpixel, and hence improves the transmittance.

Figure 12:
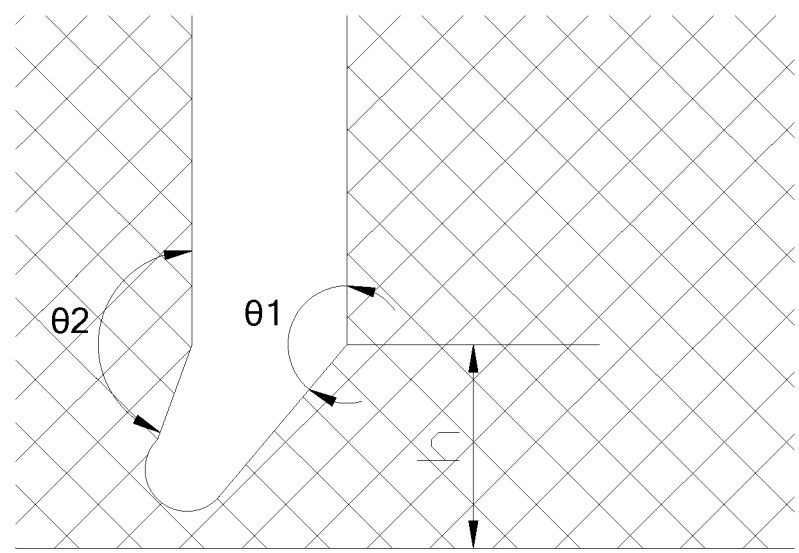
FIG. 12 is a schematic diagram illustrating the details of the turning design of the slit provided by an embodiment of the present disclosure.

For instance, as an improvement of the manufacturing method provided by the embodiment of the present disclosure, before forming the slit electrode, the method further includes: designing the slit electrode, for instance, the outline of the slit electrode, the width and the shape of the slits, the number of the slits of which one end is opened, the size and the shape of the openings, and the like can be designed, and the design standard is to realize minimum area of the dark region at the edges of the subpixel and obtain maximum transmittance. As illustrated in FIG. 12, if tail ends of the slits have turnings, the design also involves the design of the first angle (θ1), the second angle (θ2) and the turning height h of the turning, and the design standard is still to reduce the area of the dark region at the edges of the subpixel as much as possible and improve the transmittance.

Of course, it should be understood by those skilled in the art that: in the optimum design of the slit electrode, not only the area of the dark region at the edges of the subpixel must be reduced as much as possible, but also the driving electric fields at the slit electrode after design must meet other design requirements. Therefore, in actual operation, actually, the area of the dark region at the edges of the subpixel can only be reduced as much as possible, so the smallest idealized goal cannot be necessarily achieved.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

This application claims the benefit of priority from Chinese patent application No. 201610258014.2, filed on Apr. 21, 2016, the disclosure of which is incorporated herein in its entirety by reference as a part of the present application.

What is claimed is:

1. An array substrate, comprising a slit electrode, wherein the slit electrode comprises a plurality of slits; and one end of each of the plurality of slits is opened to form an opened end, the slit is formed by two adjacent electrode strips, the two adjacent electrode strips are both chamfered at a position close to the opened end to change an extension direction of the slit, and only one of the two adjacent electrode strips is further chamfered at the opened end so as to decrease a distance between the two adjacent electrode strips, and wherein openings of two adjacent slits are disposed on opposite sides of a subpixel respectively.

2. The array substrate according to claim 1, wherein, in a subpixel, the slit electrode comprises an electrode wiring provided with a plurality of bending structures.

3. The array substrate according to claim 1, wherein the slit electrode is a pixel electrode, or the slit electrode is a common electrode.

4. The array substrate according to claim 1, wherein a subpixel is a double-domain subpixel; in a first region of the subpixel, the plurality of slits of the slit electrode are extended along a first direction; and in a second region of the subpixel, the plurality of slits of the slit electrodes are extended along a second direction, and the first direction is not parallel with the second direction.

5. The array substrate according to claim 2, wherein turnings of the electrode wiring are disposed on edges of two long-sides of the subpixel respectively.

6. The array substrate according to claim 2, wherein turnings of the electrode wiring are disposed on edges of two short-sides of the subpixel respectively.

7. A display device, comprising the array substrate according to claim 1.

8. A manufacturing method of an array substrate, comprising forming a slit electrode, wherein forming the slit electrode comprises:

depositing an electrode material layer; and forming a slit electrode by a masking process with a mask, a portion of the mask applied in the masking process, where corresponding to slits of the slit electrode, being extended to edges of a subpixel, so that one end of each of the slits of the slit electrode is opened to form an opened end, wherein the slit is formed by two adjacent electrode strips, the two adjacent electrode strips are both chamfered at a position close to the opened end to change an extension direction of the slit, and only one of the two adjacent electrode strips is further chamfered at the opened end so as to decrease a distance between the two adjacent electrode strips, and wherein openings of two adjacent slits are disposed on opposite sides of the subpixel respectively.

9. The manufacturing method according to claim 8, wherein before forming the slit electrode, the method further comprises:
designing the slit electrode, and the design standard is to realize minimum area of a dark region at edges of the subpixel and obtain maximum transmittance.

10. The manufacturing method according to claim 8, wherein, in the subpixel, the slit electrode comprises an electrode wiring provided with a plurality of bending structures.

11. The manufacturing method according to claim 10, wherein turnings of the electrode wiring are disposed on edges of two long-sides of the subpixel respectively.

12. The manufacturing method according to claim 10, wherein turnings of the electrode wiring are disposed on edges of two short-sides of the subpixel respectively.

13. The manufacturing method according to claim 8, wherein the slit electrode is a pixel electrode, or the slit electrode is a common electrode.

14. An array substrate, comprising a subpixel and a slit electrode disposed in the subpixel, wherein the slit electrode comprises a plurality of slits; and one end of each of the plurality of slits is opened to form an opened end, the slit is formed by two adjacent electrode strips, the two adjacent electrode strips are both chamfered at a position close to the opened end to change an extension direction of the slit, and only one of the two adjacent electrode strips is further chamfered at the opened end so as to decrease a distance between the two adjacent electrode strips, and wherein openings of two adjacent slits are disposed on opposite sides of the subpixel respectively.

15. The array substrate according to claim 14, wherein, in the subpixel, the slit electrode comprises an electrode wiring provided with a plurality of bending structures.

16. The array substrate according to claim 14, wherein turnings of the electrode wiring are disposed on edges of two long-sides of the subpixel respectively.

17. The array substrate according to claim 15, wherein turnings of the electrode wiring are disposed on edges of two short-sides of the subpixel respectively.

* * * * *